United States Patent
Honkasalo et al.

(10) Patent No.: US 7,826,353 B2
(45) Date of Patent: Nov. 2, 2010

(54) METHOD, SYSTEM AND NETWORK ELEMENT FOR AUTHORIZING A DATA TRANSMISSION

(75) Inventors: Zhi-Chun Honkasalo, Kauniainen (FI); Tuija Hurtta, Espoo (FI); Vilho Räisänen, Helsinki (FI)

(73) Assignee: Nokia Corporation (FI)

( * ) Notice: Subject to any disclaimer, the term of this patent is extended or adjusted under 35 U.S.C. 154(b) by 1024 days.

(21) Appl. No.: 10/677,493

(22) Filed: Oct. 3, 2003

(65) Prior Publication Data

US 2004/0223602 A1 Nov. 11, 2004

(30) Foreign Application Priority Data

May 5, 2003 (EP) ................................. 03010128

(51) Int. Cl.
*H04L 12/26* (2006.01)
(52) U.S. Cl. .................. 370/230; 370/252; 370/401; 370/465
(58) Field of Classification Search ............... 370/230, 370/230.1, 252, 253, 401, 465, 310
See application file for complete search history.

(56) References Cited

U.S. PATENT DOCUMENTS

| | | | |
|---|---|---|---|
| 6,621,793 B2* | 9/2003 | Widegren et al. | 370/230.1 |
| 6,850,983 B2* | 2/2005 | Rezaiifar et al. | 709/227 |
| 6,963,555 B1* | 11/2005 | Brenner et al. | 370/351 |
| 6,970,423 B2* | 11/2005 | Chuah | 370/230 |
| 7,024,487 B2* | 4/2006 | Mochizuki et al. | 709/238 |
| 2002/0036983 A1* | 3/2002 | Widegren et al. | 370/230.1 |
| 2002/0114305 A1* | 8/2002 | Oyama et al. | 370/338 |
| 2002/0184510 A1* | 12/2002 | Shieh | 713/185 |
| 2003/0035401 A1* | 2/2003 | Shaheen et al. | 370/341 |
| 2003/0055964 A1* | 3/2003 | Rezaiifar et al. | 709/225 |
| 2004/0131023 A1* | 7/2004 | Auterinen | 370/328 |
| 2004/0190492 A1* | 9/2004 | Engmann et al. | 370/352 |
| 2005/0276229 A1* | 12/2005 | Torabi | 370/252 |

FOREIGN PATENT DOCUMENTS

WO WO 02/32165 4/2002

OTHER PUBLICATIONS

3GPP, 3rd Generation Partnership Project; Technical Specification Group Services and Aspects; Dynamic Policy control enhancements for end-to-end QoS; (Release 6), (Feb. 2003).
3GPP, 3rd Generation Partnership Project; Technical Specification Group and System Aspects; End-to-end Quality of Service (QoS) concept and architecture; (Release 5), (Mar. 2003).

* cited by examiner

*Primary Examiner*—Ricky Ngo
*Assistant Examiner*—Gary Mui
(74) *Attorney, Agent, or Firm*—Mintz, Levin, Cohn, Ferris, Glovsky and Popeo, P.C.

(57) ABSTRACT

A mechanism for controlling connection parameters for a communication connection between network elements is disclosed. When the communication connection is initialized, an authorization for the connection parameters of services is requested from a policy control entity which decides on connection parameters to be authorized for the communication connection and on service types which can be provided for the communication connection. A decision message is sent to a communication control network element wherein the decision message comprises the authorization for the connection parameters, service types usable for the communication connection, and an information portion indicating, for each service, whether or not the policy control entity controls a further authorization regarding at least one of the indicated service types in the communication connection. The decision message is enforced in the communication connection by the communication control network element.

74 Claims, 6 Drawing Sheets

METHOD, SYSTEM AND NETWORK ELEMENT FOR AUTHORIZING A DATA TRANSMISSION

BACKGROUND OF THE INVENTION

1. Field of the Invention

The invention relates to a method and/or a system and/or a communication network device and/or a communication control element usable in an arrangement for controlling connection parameters for a communication connection, in particular a packet based communication connection. The invention relates particularly to a method and/or a system and/or a communication network device and/or a communication control element usable in an arrangement for dynamically controlling connection parameters wherein connection parameters, network resources, charging information and the like are authorized by a policy control entity of a communication network.

2. Description of the Related Art

In the last years, an increasingly extension of communication networks, i.e. of wire based communication networks, such as the Integrated Services Digital Network (ISDN), or wireless communication networks, such as the cdma2000 (code division multiple access) system, cellular $3^{rd}$ generation communication networks like the Universal Mobile Telecommunications System (UMTS), the General Packet Radio System (GPRS), or other wireless communication system, such as the Wireless Local Area Network (WLAN), took place all over the world. Various organizations, such as the $3^{rd}$ Generation Partnership Project (3GPP), the International Telecommunication Union (ITU), $3^{rd}$ Generation Partnership Project 2 (3GPP2), Internet Engineering Task Force (IETF), and the like are working on standards for telecommunication network and multiple access environments.

In general, the system structure of a communication network is such that a subscriber's user equipment, such as a mobile station, a mobile phone, a fixed phone, a personal computer (PC), a laptop, a personal digital assistant (PDA) or the like, is connected via transceivers and interfaces, such as an air interface, a wired interface or the like, to an access network subsystem. The access network subsystem controls the communication connection to and from the user equipment and is connected via an interface to a corresponding core or backbone network subsystem. The core (or backbone) network subsystem switches the data transmitted via the communication connection to a destination, such as another user equipment, a service provider (server/proxy), or another communication network. It is to be noted that the core network subsystem may be connected to a plurality of access network subsystems. Depending on the used communication network, the actual network structure may vary, as known for those skilled in the art and defined in respective specifications, for example, for UMTS, GSM and the like.

Generally, for properly establishing and handling a communication connection between network elements such as the user equipment and another user terminal, a database, a server, etc., one or more intermediate network elements such as support nodes or service nodes are involved. One or more connection parameters are used for defining connection characteristics. This includes, for example, a packet based data transmission protocol information, such as a PDP (Packet Data Protocol) context information, for example, information about quality of service (QoS) requested or provided, charging-related information, such as a charging class, etc.

In particular in cases where a communication involves two or more networks of different types such as networks using different transmission protocols, e.g. GPRS/UMTS-based networks and IP-based networks, problems may occur in properly establishing the communication connection and setting the connection parameters such that they are optimal for the service in question.

Hitherto, there have been proposed several concepts for achieving a solution for these problems. For example, in the case of a 3GPP based network, such as UMTS/GPRS, the following solutions are proposed.

While in a standard 3GPP system QoS is defined per Access Point Name (APN), in 3GPP Release 5 (see, for example, 3GPP specification TS 23.207, ver5.7.9 (2003-03)), a so-called Policy Decision Function (PDF) is introduced for dynamically authorizing of QoS for IP Multimedia System (IMS) sessions. IMS specific information, Authorization Token and Flow ID(s) are used as binding information when requesting QoS authorization for a PDP context. According to 3GPP Release 5, the PDF (or also Policy Control Function PCF) is described to be implemented together with a Proxy Connection State Control Function (P-CSCF) of the IMS. However, a standardized interface towards the IMS when the PDF is not part of the P-CSCF is not defined in 3GPP Release 5.

Regarding the basic communication between a GGSN (Gateway GPRS Support node) and a PDF, reference is also made to the International patent publication No. WO 02/32165 of the present applicant, which is incorporated by reference.

In 3GPP Release 6 (see, for example, 3GPP specification TR 23.917, ver0.7.1 (2003-02)), it is planned to extend the dynamic authorization to include also streaming services (for example, Packet Switched Streaming Services (PSS)). Furthermore, according to the current understanding of 3GPP Release 6, a stand-alone Policy Decision Function (PDF) with standardized interfaces towards both the GGSN (the so-called Go-interface) and the IMS/PSS (the so-called Gq-interface) are planned.

Thus, it is to be noted that in 3GPP Release 5 and 3GPP Release 6 solutions, a dynamic QoS control for a communication connection is possible for session-based services, and in particular real-time services such as Voice over IP (VoIP) traffic. More generally, PSS streaming service is planned to be added to dynamically authorized services in 3GPP Release 6, in addition to IMS services of 3GPP Release 5.

Another approach for enhancing QoS support for IP services is the usage of so-called service aware core network element, such as a service aware GGSN (saGGSN), or the usage of so-called Intelligent Service Nodes (ISN). The saGGSN and the ISN are service aware products which can provide, for example, specific charging functions. A GGSN provides charging per PDP context whereas service specific charging functions, as one example, can operate on a service flow level. The saGGSN and the ISN are currently defined in respective specifications. A saGGSN allows for the detection of the QoS level at the network edge for selected services. With these enhanced core network elements, QoS can be controlled on a per service access point (sAP) basis or on a service basis within a sAP.

SUMMARY OF THE INVENTION

Thus, the invention provides, at least, an improved mechanism for dynamically managing and controlling connection parameters for a packet based communication connection using at least one type of service.

In particular, it is desirable to provide an improved mechanism for dynamically managing and controlling connection parameters for a packet based communication connection using at least one type of service wherein an accurate authorization for connection parameters and a provision of further information, such as QoS, charging information, and the like, for specific services and/or flows within a service used in the communication connection are possible.

According to one embodiment of the invention, there is provided, for example, a method of controlling connection parameters for a communication connection between a first network element and a second network element. The method includes the steps of initializing the communication connection and sending a connection parameter request signaling for at least one service type to be used in the communication connection from the first network element to a third network element, requesting, by the third network element, an authorization for the connection parameters from a fourth network element, deciding, in the fourth network element, on connection parameters to be authorized for the communication connection and on service types which can be provided for the communication connection, sending a decision message from the fourth network element to the third network element wherein the decision message includes at least one of the authorization for the connection parameters, service types usable for the communication connection, and an information portion indicating, for each service, whether or not the fourth network element controls a further authorization regarding at least one of the indicated service types in the communication connection.

Furthermore, according to another embodiment of the invention, there is provided, for example, a system for controlling connection parameters for a communication connection between a first network element and a second network element. The system includes a third network element via which the communication connection is initialized by sending a connection parameter request signaling for at least one service type to be used in the communication connection from the first network element, a fourth network element to which the third network element requests an authorization for the connection parameters, wherein the fourth network element decides on connection parameters to be authorized for the communication connection and on service types which can be provided for the communication connection, wherein the fourth network element generates and sends a decision message to the third network element wherein the decision message includes at least one of the authorization for the connection parameters, service types usable for the communication connection, and an information portion indicating, for each service, whether or not the fourth network element controls a further authorization regarding at least one of the indicated service types in the communication connection.

Moreover, according to a further embodiment of the invention, there is provided, for example, a communication network device for controlling connection parameters for a communication connection between a first network element and a second network element. The device comprising means for receiving from a third network element, via which the communication connection is initialized by a connection parameter request signaling for at least one service type to be used in the communication connection from the first network element, a request for an authorization for the connection parameters, means for deciding on connection parameters to be authorized for the communication connection and on service types which can be provided for the communication connection, means for generating and sending a decision message to the third network element wherein the decision message includes at least one of the authorization for the connection parameters, service types usable for the communication connection, and an information portion indicating, for each service, whether or not the device controls a further authorization regarding at least one of the indicated service types in the communication connection.

Additionally, according to an embodiment of the invention, there is provided, for example, a communication control network element usable in a system for controlling connection parameters for a communication connection between a first network element and a second network element, the communication control network element comprising means for receiving, when a communication connection is initialized by the first network element, a connection parameter request signaling for at least one service type to be used in the communication connection, means for requesting, from a fourth network element, an authorization for the connection parameters, wherein the fourth network element decides on connection parameters to be authorized for the communication connection and on service types which can be provided for the communication connection, means for receiving from the fourth network element a decision message wherein the decision message includes at least one of the authorization for the connection parameters, service types usable for the communication connection, and an information portion indicating, for each service, whether or not the fourth network element controls a further authorization regarding at least one of the indicated service types in the communication connection.

By virtue of the invention, the following advantages can be achieved:

The connection parameter control mechanism can be implemented for different types of communication networks, in particular for those using packet based data transmissions. For example, but not exclusively, the proposed solution is applicable in wired communication networks, such as ISDN, in networks using Asymmetric Digital Subscriber Line (ADSL) technique, in wireless communication networks, such as WLAN, GPRS, UMTS, and the like. The invention is also applicable in communication connections between different types of networks using, for example, different transfer protocols. In particular, the invention can be implemented, for example, in core network elements, such as communication control or gateway network elements, and in connection parameter control functions, such as policy control entities or policy decision functions (PDF).

By means of the invention it is possible to generalize the dynamic allocation of connection parameter for a communication connection, such as QoS authorization, for different types of services, for example, for session-based services, non-session-based services, such as browsing and streaming, real-time services and/or non-real-time services. This means that the same QoS management information structure can be used for all the service types between the connection parameter authorization element, e.g. the policy control network function or entity, and the communication control element, e.g. the gateway network element.

By means of the connection parameter control mechanism, a dynamic control of default QoS for packet based data transmission protocol contexts, such as PDP contexts in UMTS networks or the like, as well as an authorization of a QoS level per service and/or per service access point and simultaneously for selected flows within one or more services is possible.

It is also possible to include further information in authorization messages from the policy control entity to the communication control network element which may concern, for example, charging policies. Thus, for example, charging on a per service basis and even on a per flow basis within a service is possible.

The network signaling load can be optimized when the communication control network element, such as the GGSN or ISN, is able to discriminate services for which no further consultation with the policy control network function or entity, such as the PDF, is necessary, i.e. which flows or services can be controlled by the communication control element itself. However, by clearly defining those services for which the control remains in the policy control entity, full flexibility concerning the authorization of connection parameters and/or charging policies, and the like, is ensured.

If a definition based on a service access point (sAP) does not provide sufficient granularity, it is possible to provide information from the policy control entity to the communication control network element on a per service basis provided within a sAP. In this case, a service may be identified by a (set) of packet classifiers. Thus, an accurate identification of services or flows within a service is possible for the connection parameter control.

By means of the connection parameter control mechanism, it is also possible to take into account other criteria for the connection parameter authorization. For example, policies based on a network load in one or more of the involved communication networks can be taken into account. By discriminating connection parameter authorizations for respective services or even flows within a service, which can be changed on the basis of the network load, a flexible control of network resources is possible.

Furthermore, it is possible to dynamically allocate charging policy for relevant services and service flows.

BRIEF DESCRIPTION OF THE DRAWINGS

The above and still further objects, features and advantages of the invention will become more apparent upon referring to the description and the accompanying drawings.

DETAILED DESCRIPTION OF THE PREFERRED EMBODIMENTS

Figure 1:
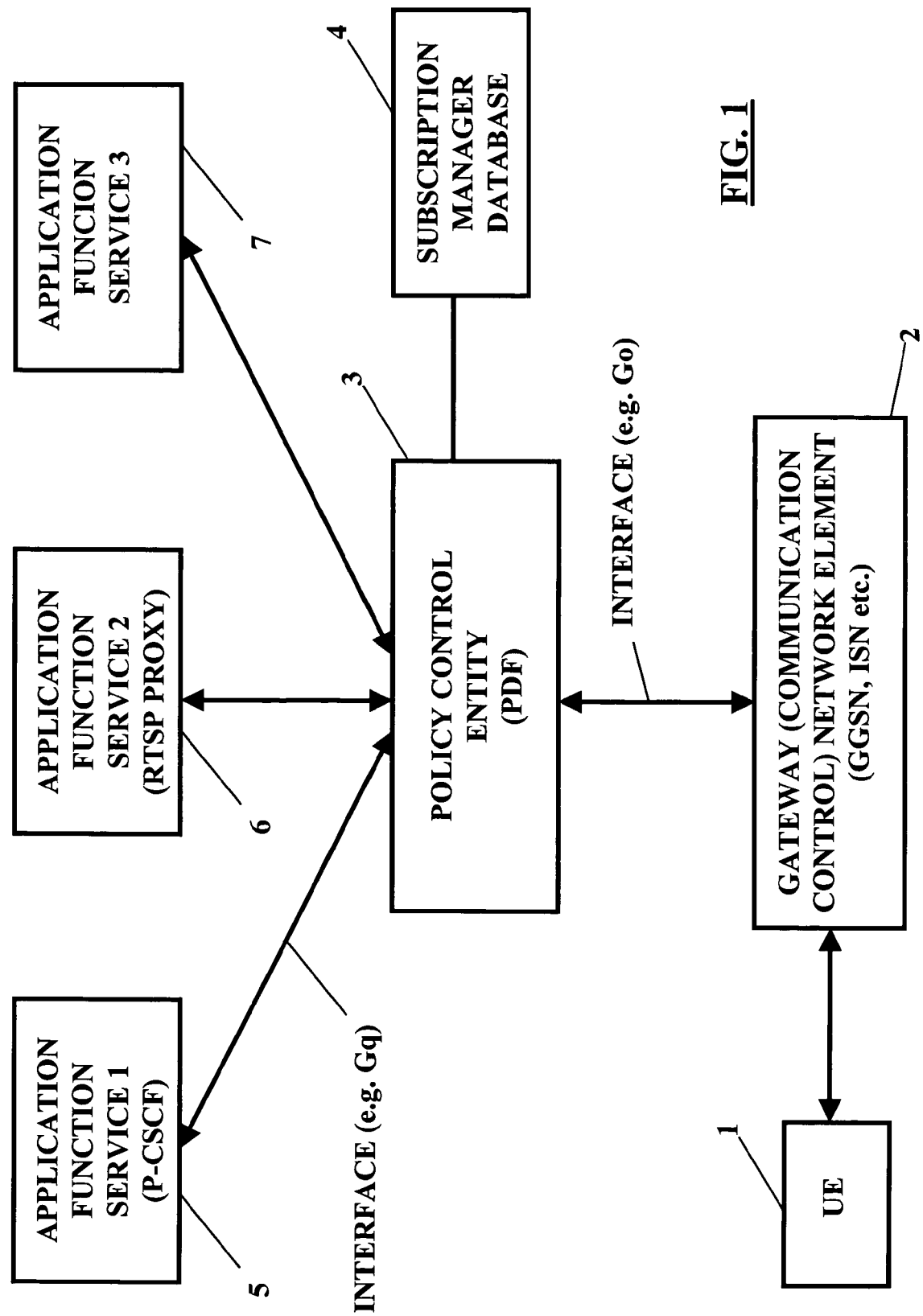
FIG. 1 shows a structure of communication network which may be employed in the invention.

As mentioned above, the connection parameter control or management mechanism is used for controlling connection parameters, such as quality of service parameters, policy parameters for charging, and the like, for a communication connection between a first network element and a second network element. The first and the second (terminal) network element may be located in different communication networks or PLMN (Public Land Mobile Network) or within the same communication network, such as ADSL, UMTS, GPRS, WLAN, or the like, wherein the communication networks of the first and second network elements may be, but does not need to be of different types.

The respective user equipment (UE) may also be a terminal apparatus of different type. For example, the UE may be a mobile or fixed phone, a personal computer, a server, a mobile laptop computer, a personal digital assistant (PDA) or the like. Irrespective of its specific type, the UE may include several means which are required for its communication functionality. Such means are for example a processor unit for executing instructions and processing data for the communication connection (e.g. transmission content and signaling related data), memory means for storing instructions and data, for serving as a work area of the processor and the like (e.g. ROM, RAM, EEPROM, and the like), input means for inputting data and instructions by software (e.g. floppy diskette, CD-ROM, EEPROM, data interface means, and the like), user interface means for providing monitor and manipulation possibilities to a user (e.g. a screen, a keyboard, a microphone and headset for communication, and the like), and network interface means for establishing a communication connection under the control of the processor unit (e.g. wired or wireless interface means, an antenna, and the like). These means can be integrated within one device (e.g. in case of a mobile or fixed telephone) or in several devices forming the user equipment (e.g. in case of a laptop).

When a communication connection by using a service type, such as a real-time (for example, Voice over IP call) or a non-real-time service (for example, interactive connection such as browsing) between the first UE and the second UE is to be established, in the case of a first UE originating a service, the first UE initializes the communication connection. This is effected, for example, by sending a communication connection request signaling for at least one service type which is desired to be used in the communication connection to the communication network to which the first UE is connected. More specifically the first UE (network element) performs a communication connection activation by sending, for example, a (primary) packet based data transmission protocol context, such as a Packet Data Protocol (PDP) context, request via an access network subsystem of the connected communication network to the core network subsystem of the connected communication network. The structures of the access network subsystem and core network subsystem depend on the respective communication network type. For existing system, these structures are commonly known for a person skilled in the art. In case of a 3GPP network system, for example, a UMTS Terrestrial Radio Access Network (UTRAN) and/or a GSM/EDGE Radio Access Network (GERAN) on the access network subsystem side as well as a Serving GPRS Support Node SGSN, a Home Location Register (HLR), a Gateway GPRS Support Node (GGSN) and the like on the core network subsystem side may be involved.

The terminating point of the communication connection, i.e. the second network element, is, for example, an application function (AF) being part of an application server or an application proxy server. The second network element is, for example, part of a multimedia system, such as an IP Multimedia System (IMS) or the like, like a Proxy Call State Control Function (P-CSCF).

The communication connection request signaling for at least one service type is received in the core network subsystem by a corresponding third network element, for example a communication control or gateway network element of the core (or backbone) network subsystem like a GGSN (or SGSN) in case of a UMTS network, an ISN, a corresponding WLAN communication control network element like a Packet Data Gateway, or the like. The communication control or gateway network element should be able to trigger a request for a dynamic policy control. Now, in order to authorize the connection parameters for the communication connection, the third network element requests a corresponding authorization for the connection parameters from a fourth network element. The third network element may be able to trigger a corresponding request to the fourth network element without having an authorization token or the like. However, it is to be noted that the connection parameter control mechanism described herein is also applicable in connection with an authorization token. In other words, an authorization token, service information like service name (e.g. emergency service, service related signaling, news, weather etc.), packet classifier and the like can be used as binding information. The fourth network element is preferably a policy control function element or entity, being for example a generalization of a 3GPP standard policy decision function (PDF) like so-called IP Service Policy Control (ISPC) element. In the following, both PDF and ISPC refer to the generalized PDF. The policy control entity is, for example, a separate network element connected via respective interfaces to other network elements, such as the gateway element and the application functions, or an integrated part of one of these network elements (for example, the P-CSCF, and the like).

The network elements used as the third and the fourth network element, such as the GGSN, an intelligent service node ISN, a service-aware GGSN, the PDF (the ISPC) may be implemented by software or by hardware. In any case, for executing their respective functions, correspondingly used devices or network elements include several means which are required for control and communication functionality. Such means are, for example, a processor unit for executing instructions and processing data (for example, transmission content and signaling related data), memory means for storing instructions and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), and interface means for establishing a communication connection under the control of the processor unit (e.g. wired and wireless interface means, an antenna, and the like).

The fourth network element, for example the policy control entity, receives a request message for authorizing connection parameters, such as a quality of service QoS level and/or charging level, for the communication connection from the third network element. The request message from the third network element may include, for example, an identification of the first network element, such as an International Mobile Subscriber Identity (IMSI), an IP address of the first network element, a mobile subscriber ISDN (MSISDN) or the like of the UE. Furthermore, an identification of a context access point of the communication connection may be included. Then, the fourth network element decides on connection parameters to be authorized for the communication connection and on service types which can be provided for the communication connection of the first network element. This decision is based, for example, on a user subscription profile which may be based in a corresponding subscription manager database connected to the fourth network element. Also application service information may be used for the decision, when appropriate. The fourth network element may receive such information from an application function (AF), such as an application server, in order to obtain information about QoS to be provided and the like. Alternatively, the application service information may be stored in the fourth network element or in a database connected to the fourth network element. The application function may also provide session beginning/ending information to the fourth network element (e.g. the PDF) which enable the fourth network element to control the gating in the communication connection. Also charging information related to services to be used in the communication connection can be obtained by the fourth network element.

When the fourth network element has decided on the connection parameters to be authorized for the communication connection, a decision message is generated and transmitted to the third network element. For services indicated to be controlled by the third network element, communication parameter policy request may be performed using the binding information (e.g., flow classifier) of any of the IP flows belonging to the service. The authorization returned by the fourth element includes the binding information (e.g. flow classifiers) of all the flows belonging to the service instance.

In the decision message several connection parameter authorizations and further information may be included. The connection parameter authorizations may be included for each flow of a service. Additionally, aggregate connection parameters can be sent to the third network element as a part of the set of parameters. For example, the authorization for a quality of service level to be provided for the packet based data transmission protocol context is included in the decision message. Additionally, a list of service types usable for the communication connection, i.e. of services currently activated or allowed may be included. Furthermore, associated control policies and information, such as charging information, can be included. As an example, information related to services and policies to be taken into account for the communication connection by the third network element can be included in the form of an information portion such as one or more vectors. Such a vector may have the form of {service (i), policy (i)} wherein for each activated/allowed service (i) specific policy information are provided. The definition of a service may be provided, for example, by the network service management system by configuration. For instance, a service can be referred by a service access point (sAP) name or by a set (i.e. one or more) of packet classifiers. For a particular service (i), the policy element may indicate whether a further authorization of flows within this service definition is needed from the fourth network element when the third network element receives a flow in the service in the communication connection. On the other hand, it may also be indicated that no further consultation (i.e. authorization) of the fourth network element is necessary for the third network element. In other words, it is indicated for each service, whether the fourth network element controls a further authorization regarding at least one of the indicated service types in the communication connection or not (for example, the third network element may control the service and corresponding flows within the service). If the fourth network element does not control the further authorization of a service, the service specific policy like QoS and/or charging level may be included in the decision message. The fourth network element may provide for the packet based data transmission protocol context a maximum QoS level. As a further option, the fourth network element can also indicate in the decision message, for example, overall QoS parameters for the communication connection (based on the packet based data transmission protocol context) as well as default QoS parameters for services, per service, authorized by the third network element. It is also possible to include, for each service, policy information regarding the charging for the service. Additionally, it is also possible to take into account specific criteria, for example the time of the day (for providing different resources for day and night time, for example) or the load situation in the communication network(s) involved. Thus, it is possible to use policies which may be based, for example, on a network load, wherein respective policies or connection parameters can be chosen for specific service types of the communication connection.

The third network element receives the decision message from the fourth network element and processes the decision message in order to determine the connection parameters authorized, for example the authorized QoS level. Then the third network element, as the communication control network element, enforces the authorized connection parameters in the communication connection of the first network element. Additionally, the third network element determines, on the basis of the information portion such as the vector(s), those service types of the communication connection in which flows can be admitted by the third network element without consulting the fourth network element, and those service types of the communication connection in which flows are to be still controlled by the fourth network element.

During the communication connection, the third network element may receive flows in the service(s) authorized for the communication connection. The introduction of a new flow may be associated with an invocation of a new traffic aggregate (for example, a (secondary) packet based data transmission protocol context activation, such as a secondary PDP context activation), but may also take place without explicit signaling.

In the case where the third network element receives a flow of a service which is indicated in the decision message to be controlled by the fourth network element, the third network element may send a further request message to the fourth network element for authorizing connection parameters for this service type in question, e.g. for a flow. The request message may include a specification of the service in question. In particular, the third network element may be able to trigger the (further) request to the fourth network element without having an authorization token or the like. However, it is to be noted that the connection parameter control mechanism described herein is also applicable in connection with an authorization token. In other words, an authorization token, a packet classifier and the like can be used as binding information for the authorization request of a flow in the service in question. The fourth network element receives the further request and decides, in a similar manner to that described above, on connection parameters, such as QoS level, to be authorized for the service type in question. The fourth network element may receive information from the application function which may include communication connection (or session) beginning/ending information. Also, the fourth network element should be able, in particular for session-based services which are authorized by the fourth network element, to receive information about flows included in the session. Additionally, for the decision of the fourth network element, further information regarding, for example, charging of this service or even of the specific flow can be determined by the fourth network element. Then, a further decision message is sent from the fourth network element to the third network element. This further decision message may include the decided authorization for the connection parameters, e.g. the QoS level like a QoS class and a bit rate, or further QoS parameters, for the service in question. If determined, also charging information can be transmitted by this further decision message. Moreover, aggregate connection parameters (e.g. a respective level of connection parameters) can be sent to the third network element as a part of a set of parameters authorized. The third network element then enforces these connection parameters for the service in question in the communication connection.

On the other hand, in the case that the third network element receives a flow of a service type which is indicated to be controlled, for example, by the third network element itself, the third network element may admit the flow and does not send a request to the fourth network element. Instead, the third network element may use provisioned connection parameters for this service, for example a default QoS level indicated in the (first) decision message. This QoS level (or levels) may be provisioned per sAP or per service statically in the third network element, or sent—per service—by the fourth network element as part of the service policy decision message.

In the following, with reference to FIGS. 1 to 4, a specific example for an implementation of the above generally described connection parameter control mechanism is described. In this example, it is assumed that the connection parameter management or control is performed for a communication connection of a first network element being a user equipment UE in a mobile communication network, such as a 3GPP based network. However, it is to be understood that this example is not intended to limit the connection parameter management or control application. Rather, the connection parameter control is also applicable in network structures different to the one described below wherein respective other types of signaling and network elements are used for the functions of the communication control or gateway network element and the policy control entity.

Since the described connection parameter control mechanism is related in particular to an interaction between the core network communication control or gateway network element, such as the GGSN, and the policy control entity, such as the PDF, the following description is concentrated on these parts of the communication network. However, it is to be understood that for the establishment of the communication connection other network elements are involved. This is described, for example, in corresponding specifications, such as the 3GPP specifications, which are known for person skilled in the art so that a detailed description thereof is omitted herein for the sake of simplicity.

In FIG. 1, a simplified structure of a 3GPP based communication network is shown in which the connection parameter management or control is implemented. In FIG. 1, reference sign 1 denotes a user equipment UE, such as a mobile phone or the like, which represents the first network element. Reference sign 2 denotes a gateway or communication control network element, such as a GGSN, which may be located in the core network subsystem of the communication network of the UE 1. This network element 2 represents the third network element. Reference sign 3 denotes a policy control entity such as a PDF (e.g. ISPC), which represents the fourth network element. Reference sign 4 denoted a subscription manager database connected with the policy control entity 3 and storing, for example, user subscription profiles used for the connection parameter decision by the policy control entity 3. Reference signs 5 to 7 denote respective application function of services 1 to 3 with which the UE 1 may establish a communication connection using at least one service type, such as a real-time or a non-real-time service. The application functions may serve as the second network element or may provide a further connection to a second network element connected therewith. Specifically, reference signs 5 denotes a P-CSCF located in a (not shown) IMS, reference sign 6 denotes a Real Time Streaming Protocol (RTSP) Proxy/Server, while reference sign 7 denotes another applicable application function. It is to be noted that there may be provided also other application functions or communication networks (not shown) with which the UE 1 may be connected.

For the communication connection and the transmission of signaling messages, respective connections and interfaces between the network elements are provided. The connection between the UE 1 and the GGSN 2 is provided, for example, by means of respective access network (e.g. UTRAN) and core network (e.g. SGSN) subsystems and elements. The interface between the GGSN 2 and the PDF 3 is, for example, a Go interface according to 3GPP. The interface between the PDF 3 and the application functions 5 to 6 is subject to respective standardization of 3GPP.

With reference to FIGS. 2A, 2B, and 3 and 4, the connection parameter management or control for a communication connection in the communication network according to FIG. 1 is described below.

Figure 2A:
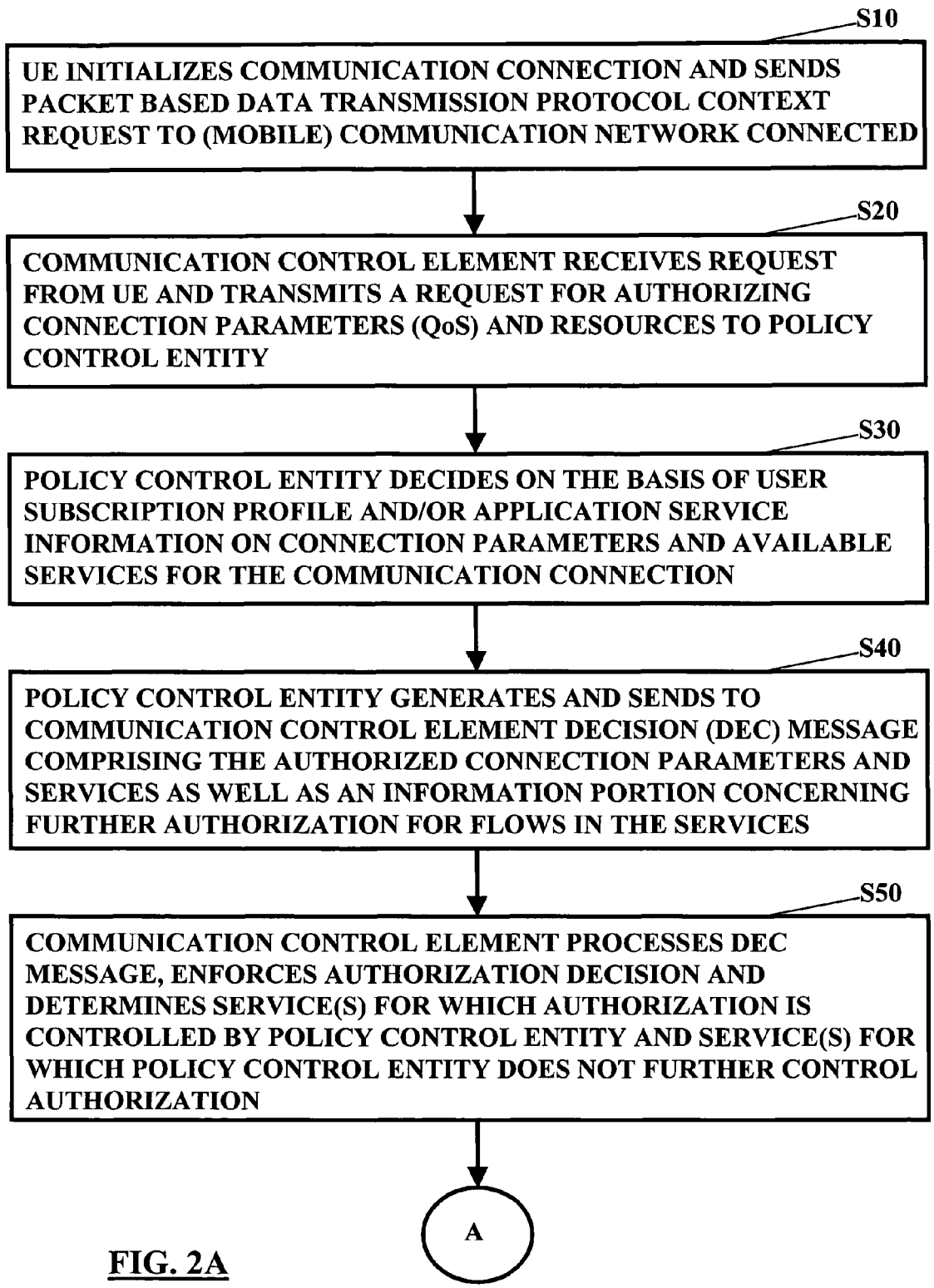
FIGS. 2A and 2B show a flow chart describing a connection parameter control method according to an embodiment of the invention.

The UE 1 initializes a communication connection in which at least one service type (for example an interactive traffic class service) is used. For this purpose, a request for a (primary) PDP context is sent to the communication network and to the GGSN 2 (FIG. 2A, step S10). The GGSN 2 receives the PDP context request and contacts the PDF 3 for authorizing connection parameters such as QoS and/or charging level associated with the (primary) PDP context (FIG. 2A, step S20). As also shown in the example in FIG. 3, the request message for authorizing the (primary) PDP context sent to the PDF 3 includes an identification UE_ID (for example IMSI, MSISDN, UE_IP Address) and a context access point (cAP) for the PDP context as parameters. The GGSN 2 is preferably able to trigger such a request to the PDF 3 without having an authorization Token. However, as binding information, also the authorization token and/or a service information like service name (e.g. emergency service, service related signaling, news, weather, etc.), packet classifier and the like can be used in this stage.

Now, the PDF 3 decides, in response to the request, on connection parameters, such as QoS and/or charging level, to be authorized for the communication connection, in particular for the (primary) PDP context. For this decision, the PDF 3 can use a user subscription profile obtained, for example, from the subscription manager database 4 and application service information whenever appropriate. QoS information for the service used in the communication connection can be received, for example, from at least a respective one of the corresponding application functions 5 to 7 (FIG. 1) providing the service (or services). For example, the P-CSCF 5 can send session information to the PDF 3. Alternatively, the application service information may be stored in the PDF or in a database connected to the PDF. The PDF 3 generates a decision message (DEC in FIG. 3) with which the QoS authorization decision on behalf of the GGSN 2 is provided. For example, the PDF 3 provides a maximum PDP context QoS and/or charging level. Additionally, the DEC message includes a list of the currently activated/allowed services and associated control policies, for example, in the form of a vector {service(i), policy(i)}. The definition of a service is provided by the network service management system through configuration. For example, a service can be referred by a service access point name or by a set (i.e. one or more) of packet classifiers. For a particular service, the policy tells whether (or not) a further authorization of flows within the service definition is needed from the PDF 3. In other words, the PDF 3 determines which services has to be authorized again by PDF 3 (if identified) and which services can be GGSN controlled (e.g. per sAP or per service). If a service does not require further authorization by the PDF, the service specific policy may indicate e.g. quality of service level for the service. Furthermore, charging policies for the services can be transmitted in the DEC messages as well. Alternatively, in the initial authorization phase for the (primary) PDP context, the PDF 3 can indicate also overall QoS parameters for the connection (PDP context type) as well as default QoS parameters for the services authorized by GGSN 2. The above steps are indicated as steps S30 and S40 in FIG. 2A.

In the above described procedure, if a sAP does not provide enough granularity, information from PDF 3 to the GGSN 2 can be provided per service provided within a sAP. In this case, a service may be identified by a set (i.e. one or more) of packet classifiers.

As an example, the PDF 3 may authorize in steps S30 and S40 the Interactive traffic class for a PDP context and may set "GGSN controlled" for the sAPs (services) of the Interactive traffic class and "PDF controlled" for other sAPs.

The GGSN 2 receives the DEC message from the PDF 3 and processes it (FIG. 2A, step S50). On the basis of the authorization information for the QoS level indicated in the DEC message, the $GGSN_2$ enforces the decision of the PDF 3 for the connection parameters in the user plane processing (PDP context) and the QoS signaling for the communication connection. In order to enforce the decision of the PDF 3, the GGSN 2 may map parameters received in the DEC message to connection parameters (e.g. mapping QoS class to traffic class, traffic handling priority and allocation/retention priority). Additionally, the GGSN 2 can determine from the information portion including the vector described above for which services the PDF 3 has to be consulted again ("PDF controlled) for authorization and which services can be GGSN controlled (e.g. per sAP or service).

Figure 2B:
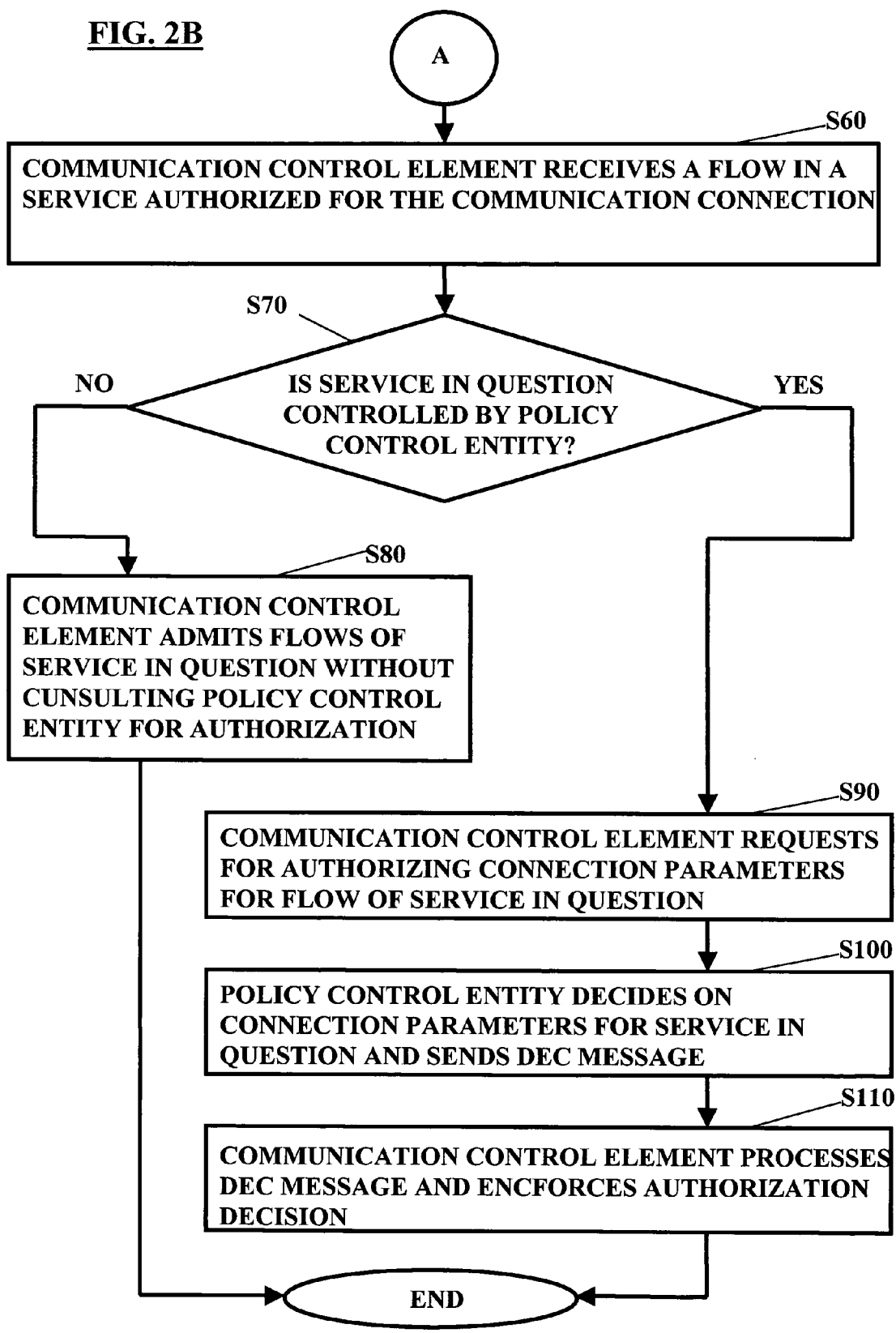
Figure 3:
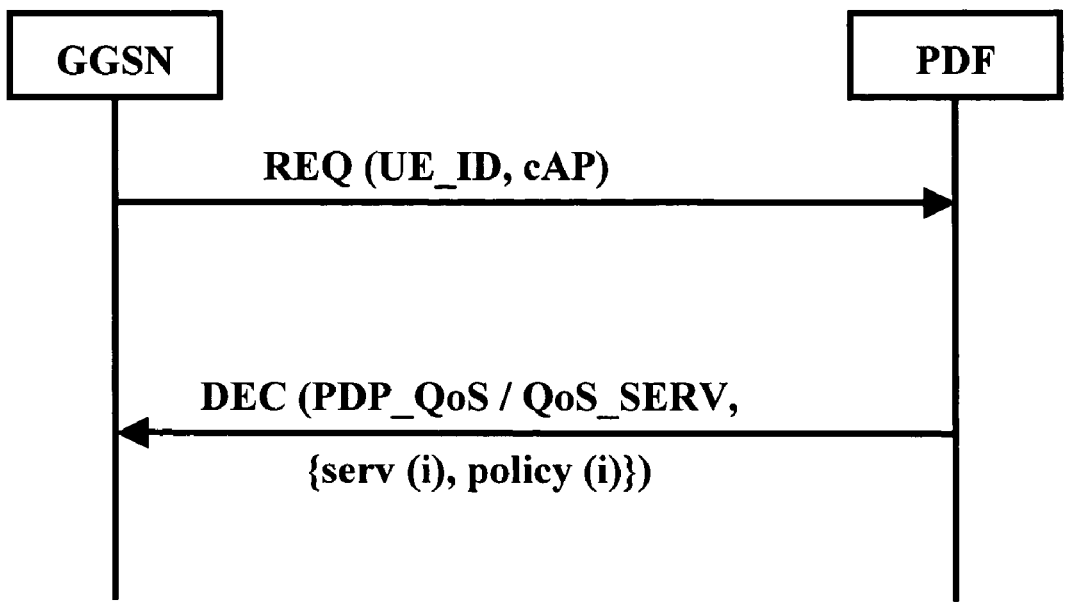
FIG. 3 shows a connection parameter authorization signaling diagram according to an embodiment of the invention.

When the GGSN 2 receives a new flow in an authorized service at the communication connection (FIG. 2B, step S60), the GGSN 2 recognizes whether or not the service in question is "PDF controlled" (FIG. 2B, step S70) on the basis of the determination from the DEC message (see FIG. 3). For this purpose, a corresponding determination result may be stored in the GGSN 2 at the (primary) PDP context authorization procedure.

Figure 4:
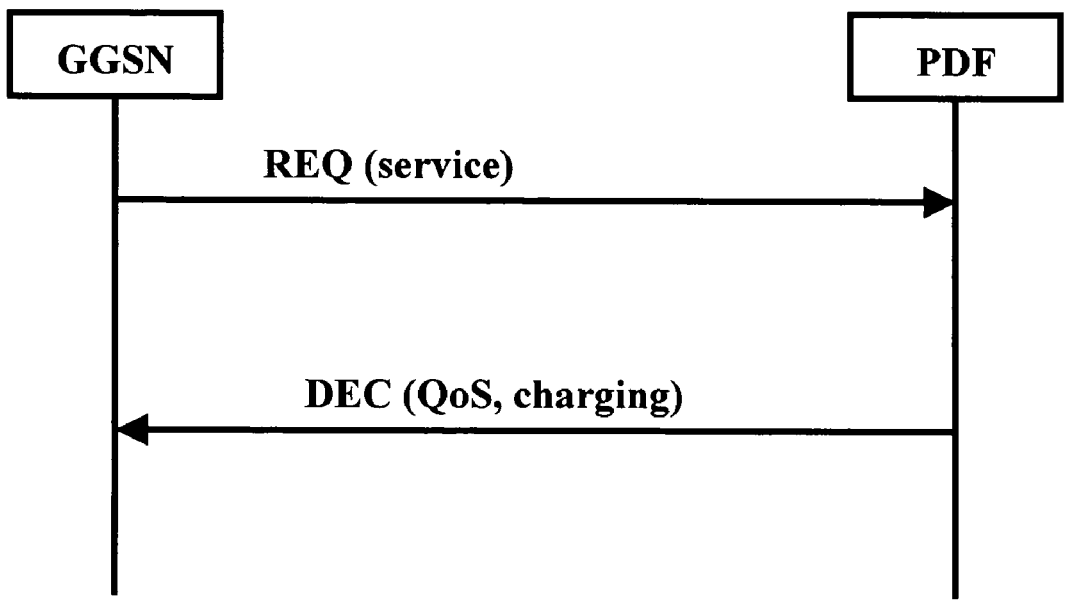
FIG. 4 shows a connection parameter authorization signaling diagram according to an embodiment of the invention.

In the case where the GGSN 2 recognizes that the new flow is within a service (or from a sAP) to be controlled by the PDF 3, a further request for authorization is sent by the GGSN 2 to the PDF 3 (FIG. 2B, step S90). In FIG. 4 there is shown a procedure which is executed when the GGSN 2 receives such a new flow in a service indicated to be "PDF controlled". The request message for service authorization specifies the service in question. The GGSN 2 is preferably able to trigger a such a request to the PDF 3 without having an authorization token, but the same scheme can also be used in connection with standard 3GPP Release 5 session-based services (authorization token and/or flow identifications can be used as binding information for the request). The service can be referred by the service name and/or alternatively by a packet classifier, which identifies the received service flow(s) by the GGSN 2. The PDF 3 decides, in response to this further request, on an authorization for a QoS and/or charging level for the service in question (FIG. 2B, step S100). This can be performed, for example, on the basis of a user subscription profile, application service information, QoS information for the service in question received, for example, from the corresponding application function 5 to 7 (FIG. 1) providing the service, and the like. The PDF 3 may receive, for example, information from the P-CSCF 5 about flows of the service in question as well as information pertaining to commencement and termination of sessions. Then, a further decision message is generated and sent to the GGSN 2. The decision includes the authorized QoS level, for example QoS class and bit rate, or further QoS parameters for the service in question. Additionally, also charging information can be carried in the decision messages. Hence, a QoS authorization for individual flows as well as charging information on a 'per flow basis' are available for the GGSN 2. The GGSN 2 processes the further decision message and enforces the authorization decision and policy information for the flow (or flows) of the service in question (FIG. 2B, step S110). In order to enforce the decision of the PDF 3, the GGSN 2 may map parameters received in the DEC message to parameters to be applied for the service flow(s) in the communication connection (e.g. mapping QoS class to traffic class, traffic handling priority and allocation/retention priority).

On the other hand, if the decision in step S70 of FIG. 2B is NO, i.e. the service in question is "GGSN controlled", the new incoming flows can be admitted by GGSN 3 (FIG. 2B, step S80). Hence, the PDF 3 must not be consulted for further authorization of QoS, charging or the like. In such a case, the QoS is controlled by a per-sAP, or per service, provisioned QoS level. In the latter case, QoS policy obtained from the PDF during the primary PDP context activation can be used.

It is to be noted that the connection parameter control described above may work in cases where the first and second network element are located in the same communication network and in cases where the first and second network element are located in different communication networks. In particular in the latter case, the third network element is a gateway network element.

Furthermore, it is to be noted that the described connection parameter control mechanism in the third network element can trigger the request to the fourth network element with or without an authorization token. Moreover, even though the above example describes the processing in connection with a primary packet based data transmission protocol context activation, such as a primary PDP context activation, the processing of the connection parameter control mechanism may be also executed in connection with a secondary packet based data transmission protocol context activation, such as a secondary PDP context activation. Alternatively, the processing of the connection parameter control mechanism may be also executed in connection with a packet based data protocol context modification, such as a PDP context modification.

Alternatively to the above described content of the decision message, there may also be applicable to further alternatives in the connection parameter control. According to the above, the decision message from the fourth network element to the third network element includes the authorization for the connection parameters, service types usable for the communication connection, and an information portion indicating whether or not (i.e. PDF controlled or GGSN controlled, for example) the fourth network element controls a further authorization regarding at least one of the indicated service types in the communication connection. On the other hand, it is also possible that the decision message from the fourth network element indicates that a service (or service flow) is PDF controlled by omitting the information portion indicating whether or not the fourth network element controls a further authorization. In this case, the third network element is set such that each new service flow of a service in question requires a control by the fourth network element. Optionally, in such a case, the third network element is set such that a control by the fourth network element is required at least for those service flows for which a QoS and/or a charging level is not available in the third network element. As a further alternative, the information portion and/or the set of authorized services indicated in the decision message are introduced with an empty content. This means that the third network element receives no specific information about the further control (e.g. by GGSN or PDF) of service flows and is set such that each new service flow of a service in question requires a control by the fourth network element (or such that a control by the fourth network element is required at least for those service flows for which a QoS and/or a charging level is not available in the third network element). In the cases described above, for example, the third network element may receive (and enforce) only the authorization for the connection parameters.

Furthermore, the decision of the fourth network elements can also be transmitted to the third network element in a split form. This means, for example, that a first message indicating the decision of authorization of connection parameters is sent by means of a first message and that a second (or even a third) message including information about service types usable for the communication connection and/or the information portion indicating whether or not the fourth network element controls a further authorization regarding at least one of the indicated service types in the communication connection is send thereafter. The respective context of the messages can also be mixed in a different way (e.g. authorization and service types usable in a first message and information portion in a second message). The order of sending the respective messages may also be changed.

Moreover, it is to be noted that in the decision for the connection parameters (e.g. QoS level) a default value or level for connection parameters may be set by the fourth network element, in particular for services (or per service) which are indicated to be controlled by the third network element, and this is sent to the third network element. In other words, in the decision for the connection parameters, a default value or level for connection parameters (e.g. default QoS level) may be set by the fourth network element, per service, for services which are indicated to be controlled by the third network element, and sent to the third network element Furthermore, it is to be noted that the information used by the fourth network element (e.g. PDF) to obtain the decision on the communication connection parameters may change during the lifetime of the communication connection. For example, the user subscription profile may be changed (in the subscriber management system). Also the provisioned service application information (e.g. from AF) may change. In this case, the fourth network element (e.g. the PDF) is adapted to send unsolicited DEC messages to the third network element (e.g. the GGSN). These unsolicited DEC messages may include the same information as described for the initial DEC messages concerning the connection parameter authorization. For this purpose, the fourth network element may store this information for later usage during the initial deciding step. Alternatively, new connection parameters may be determined by the fourth network element in parallel to the procedures described above. When the third network element (e.g. the GGSN) receives such unsolicited DEC messages, it enforces the decision indicated in the unsolicited DEC message correspondingly.

With the described connection parameter management or control, it is possible to dynamically control the maximum and/or default QoS, for example, for PDP contexts, as well as authorizing QoS for selected flows and using of per-sAP provisioning at the same time, particularly when working together with an sa-GGSN or ISN. The invention allows for dynamic control of QoS authorization and optionally also of charging for selected services, also non-session based services, such as browsing. This means that the same QoS management or control information structure can be used for all services between the QoS authorization element and the gateway network element. Additionally, such a capability also allows for policies based on network load, for example.

Figure 5:
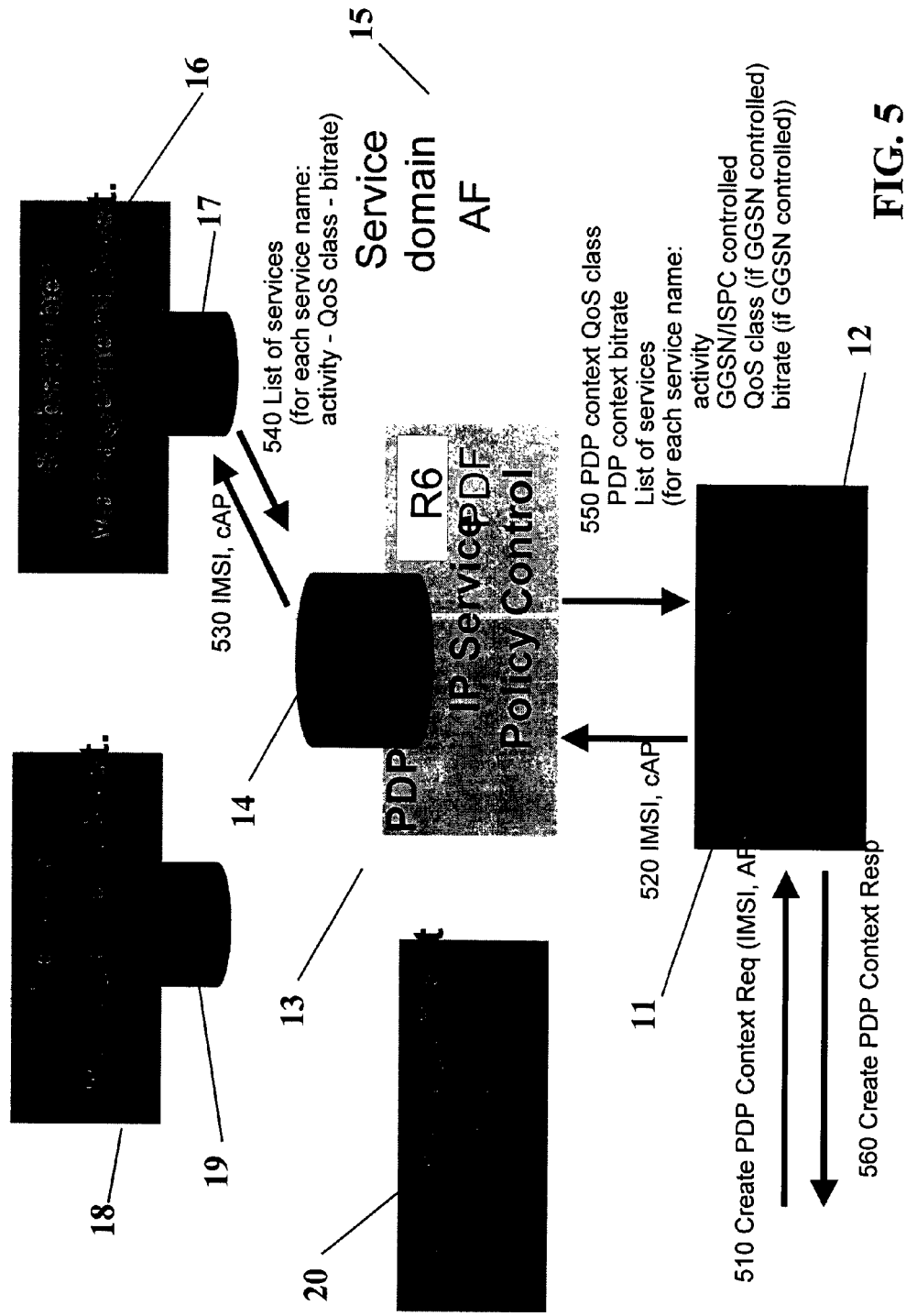
FIG. 5 shows an example of a scenario for a connection parameter control according to the invention.

In FIG. 5, there is illustrated a scenario for the connection parameter control in connection with a primary PDP context activation in a case where a PDF control (ISPC control) is required for a APN. Similar to the structure according to FIG. 1, in the structure of FIG. 5, there are shown a GGSN 11 having an Policy Enforcement Point (PEP) 12, an IP Service Policy Control element 13 as a PDF (also referred to Policy Decision or Determination Point PDP) and connected with a local rules repository 14. Furthermore, a Service domain AF 15 and a Subscriber Management System 16 including a Subscriber database 17 are shown. Additionally, and different to FIG. 1, a Service Management System 18 including a service database 19 as well as a QoS Management System 20 are involved.

In the scenario according to FIG. 5, in step 510, a Create PDP Context Request including the IMSI and the APN is sent to the GGSN 11. From the GGSN 11, in step 520, a corresponding authorization request is forwarded to the PDF 13 wherein the authorization request includes the IMSI and a cAP. In step 530, the PDF 13 transmits the IMSI and the cAP to the Subscriber Management System 16. From the Subscriber Management System 16, in step 540, the PDF 13 receives a list of services wherein for each service name an activity information, a QoS class and/or a bitrate is included. In step 550, the PDF 13 decides on the authorization (for the primary PDP context activation) and sends a decision message to the GGSN 11 (i.e. to the PEP 12). The decision message includes a PDP context QoS class, a PDP context bitrate, and a list of services wherein the list includes for each service name an activity information, an indication whether GGSN or PDF controlled, a QoS class (if GGSN controlled) and/or a bitrate (if GGSN controlled). The GGSN 11 enforces the authorization decision and sends a Create a PDP context response message in step 560.

Figure 6:
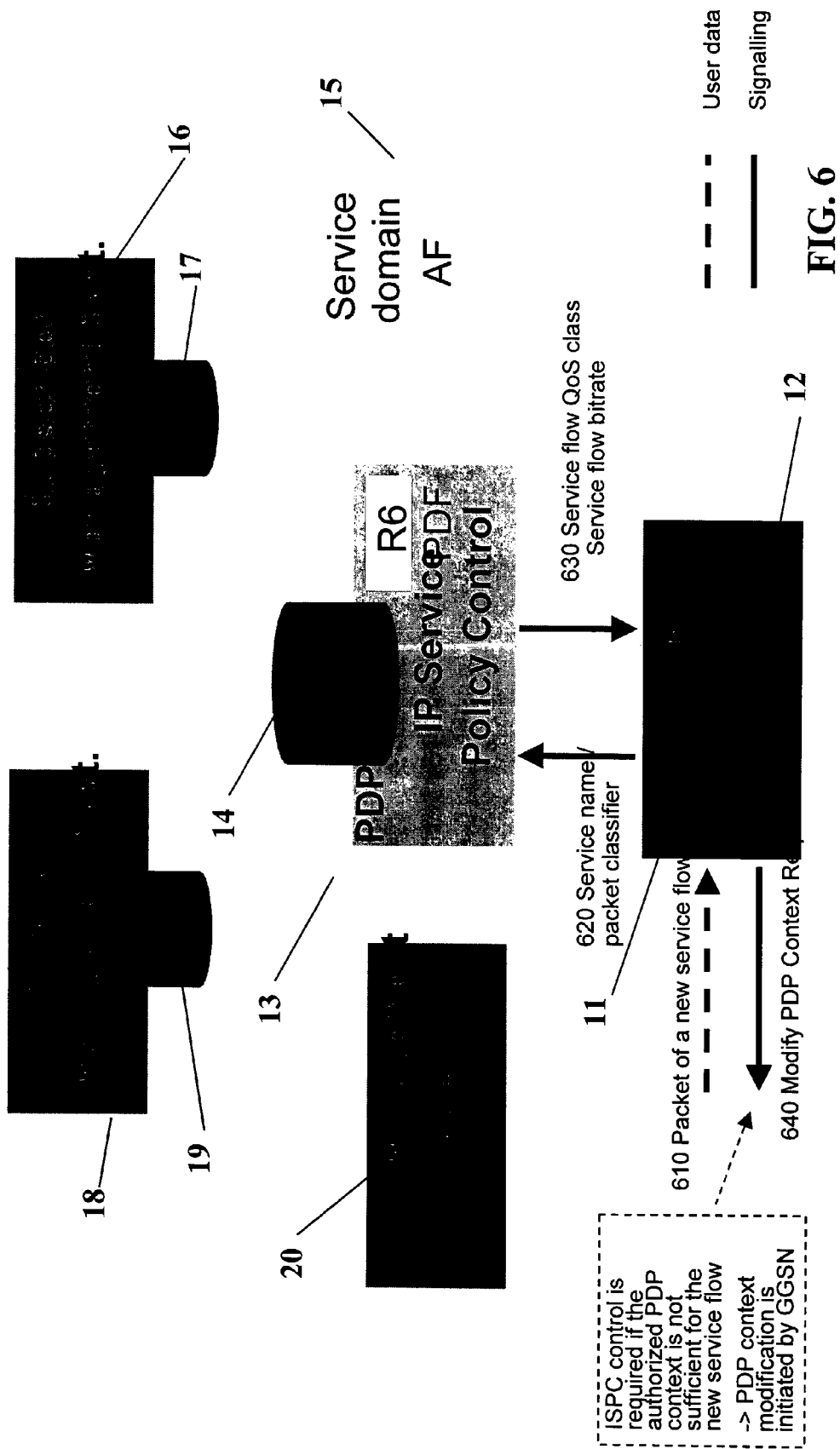
FIG. 6 shows another example of a scenario for a connection parameter control according to the invention.

In FIG. 6, there is illustrated a scenario for the connection parameter control in connection with a new service flow in case PDF (ISPC) control is required. The structure of the elements according to FIG. 6 is equivalent to that described in FIG. 5. Furthermore, straight line arrows indicate a signaling transmission while dashed line arrows indicate a user data transmission.

In the scenario according to FIG. 6, in step 610, in connection with the transmission of user data, a packet of a new service flow is transmitted to the GGSN 11. The GGSN 11 recognizes that the service in question is PDF (ISPC) controlled and transmits, in step 620, a request message including the service name/packet classifier to the PDF 13. The PDF 13 decides on connection parameters for the service in question and forwards in step 630 a decision message indicating the service flow QoS class and/or service flow bitrate to the GGSN 11. The GGSN 11 enforces the decision and transmits, for example, a Modify PDP Context Request in step 640. The PDF control is required, for example, when the authorized PDP context (e.g. primary or secondary) is not sufficient for the service flow. This results in a PDP context modification which is initiated by the GGSN 11.

It is to be noted that also charging information may be included in the scenarios according to FIGS. 5 and 6, as described above.

As described above, there is disclosed a mechanism for controlling connection parameters for a communication connection between network elements. When the communication connection is initialized, an authorization for the connection parameters of services is requested from a policy control entity which decides on connection parameters to be authorized for the communication connection and on service types which can be provided for the communication connection. A decision message is sent to a communication control network element wherein the decision message includes the authorization for the connection parameters, service types usable for the communication connection, and an information portion indicating, for each service, whether or not the policy control entity controls a further authorization regarding at least one of the indicated service types in the communication connection. The decision message is enforced in the communication connection by the communication control network element, which also determines, on the basis of the information portion, those service types of the communication connection flows of which can be admitted by itself without a consultation of the policy control entity, and those service types of the communication connection flows of which are to be controlled by the policy control entity.

It should be understood that the above description and accompanying figures are merely intended to illustrate the present invention by way of example only. The described embodiments of the present invention may thus vary within the scope of the attached claims.

The invention claimed is:

1. A method, comprising:

receiving, by a policy control entity, a request by a gateway or communication control network element for an authorization for connection parameters, wherein at least one service data flow is used in a communication connection from a user equipment to the gateway or communication control network element and the communication connection aggregates multiple service flows;

deciding, in the policy control entity, on the connection parameters to be authorized for the communication connection and on service data flows that can be provided for the communication connection; and sending a decision message from the policy control entity to the gateway or the communication control network element, wherein the decision message is processed to enforce a decision of the policy control entity in the communication connection, and wherein the decision message comprises an information portion for each service data flow from which, for the each service data flow, it is derived that for at least one of service data flows the policy control entity is to be consulted for a further authorization to admit the at least of service flows.

2. The method according to claim 1, wherein the information portion is usable to determine service data flows of communication connection flows that can be admitted by the gateway or communication control network element without consulting the policy control entity, and service data flows of communication connection flows that are to be controlled by the policy control entity.

3. The method according to claim 2, further comprising:

receiving a request by the gateway or communication control network element for connection parameters for types of communication connection flows that are indicated to be controlled by the policy control entity;

deciding, in the policy control entity, on the connection parameters to be authorized for the types of communication flows in question based upon the request; and sending a further decision message from the policy control entity to the gateway or communication control network element, wherein the further decision message comprises the authorization for the connection parameters of the types of communication connection flows in question.

4. The method according to claim 2, further comprising:
providing, for a flow of the types of communication connections that are indicated to be controlled by the gateway or communication control network element, provisioned connection parameters for the types of communication connection flows controlled by the gateway or communication control network element.

5. The method according to claim 2, wherein the request comprises using, when indicating the types of communication connection flows that are to be controlled by the policy control entity, at least one of an authorization token and a flow identification as binding information.

6. The method according to claim 1, further comprising:
connecting a mobile communication network with user equipment comprising the user equipment.

7. The method according to claim 1, wherein the gateway or communication control network element comprises a communication control or gateway network element of the communication network of a mobile communication network, wherein the communication control or gateway network element is configured to trigger a dynamic policy request.

8. The method according to claim 1, wherein the request comprises requesting the authorization from the policy control entity comprising a policy control network function that is configured to perform the deciding based on at least one of a user subscription profile and application service information.

9. The method according to claim 1, wherein the request comprises requesting the policy control entity being a separate network element or included in the gateway or communication control network element.

10. The method according to claim 1, wherein the request comprises requesting the authorization for the connection parameters comprising a quality of service level to be provided for the communication connection.

11. The method according to claim 1, wherein the deciding comprises deciding on the service data flows defined based on at least one of a service access point, a service packet classifier and aggregate level parameters pertaining to the communication connection based on the connection parameter request signaling.

12. The method according to claim 1, wherein the sending comprises sending the decision message or messages comprising charging information for the communication connection using at least one service data flow.

13. The method according to claim 1, wherein the deciding comprises deciding on the service data flows including at least one of real-time service data flows and non real-time service data flows.

14. The method according to claim 1, wherein the sending comprises sending, in the decision message, aggregate connection parameters to the gateway or communication control network element as a part of a set of parameters.

15. The method according to claim 1, wherein the request comprises requesting the authorization from the policy control entity, when session-based service data flows are authorized by the policy control entity, being configured to receive information about flows included in a session and information pertaining to a commencement and termination of sessions.

16. The method according to claim 1, further comprising:
locating the user equipment in different communication networks or in a same communication network as a second communication entity with which the communication connection is established.

17. The method according to claim 1, further comprising:
setting a default value for the connection parameters for other service data flows for which the policy control entity is not to be consulted for a further authorization to admit the service flow.

18. The method according to claim 17, wherein the setting comprises setting a default value for connection parameters per service data flow.

19. The method according to claim 1, wherein the decision message comprises an information portion from which it is derived that for other service data flows the policy control entity is not to be consulted for a further authorization to admit the service flow.

20. A system, comprising:
a third network element via which a communication connection is initialized, and that is configured to send a connection parameter request signaling for at least one service data flow to be used in the communication connection from a first communication entity; and
a fourth network element to which the third network element requests an authorization for connection parameters, wherein the fourth network element is configured to decide on the connection parameters to be authorized for the communication connection and on service data flows that can be provided for the communication connection, wherein at least one service data flow is used in the communication connection and the communication connection aggregates multiple service flows;
wherein the fourth network element is further configured to generate and send a decision message to the third network element, wherein the decision message comprises an information portion for each service data flow from which, for the each service data flow, it is derived that for at least one of the service data flows the fourth network element is to be consulted for a further authorization to admit the at least one of the service flows;
and wherein the third network element is configured to process the decision message to enforce the decision of the fourth network element in the communication connection.

21. The system according to claim 20, wherein the third network element is configured to
process the decision message comprising the information portion indicating, for each service data flow, whether or not the fourth network element controls a further authorization regarding at least one of the service data flows in the communication connection, and
determine, based on information portion, service data flows of communication connection flows that can be admitted by the third network element without consulting the fourth network element, and types of the communication connection flows that are to be controlled by the fourth network element.

22. The system according to claim 21, wherein the third network element is configured to request, when the third network element receives a flow of the types of communication connections that are indicated to be controlled by the fourth network element, the connection parameters for the types of communication connection flows from the fourth network element, and
wherein the fourth network element is configured to decide on the connection parameters to be authorized for the service data flow in question and is further configured to generate and send a further decision message to the third network element, wherein the further decision message comprises the authorization for the connection parameters of the types of communication connection flows in question.

23. The system according to claim 21, wherein the third network element is configured to admit, when the third network element receives a flow of the types of communication connections that are indicated to be controlled by the third network element, the flow by using provisioned connection parameters for the types of communication connection flows controlled by the third network element.

24. An apparatus, comprising:
a processor configured to
receive from a third network element, via which a communication connection is initialized by a connection parameter request signaling for at least one service data flow to be used in the communication connection from a first communication entity, a request for an authorization for the connection parameters, wherein at least one service data flow is used in the communication connection and the communication connection aggregates multiple service flows,
decide on connection parameters to be authorized for the communication connection and on service data flows that can be provided for the communication connection, and
generate and initiate sending of a decision message to the third network element, wherein the decision message is processed to enforce a decision of the apparatus in the third network element, and wherein the decision message comprises an information portion for each service data flow, from which, for the each service data flow, it is derived that for at least one of service data flows the apparatus is to be consulted for a further authorization to admit the at least one of service flows.

25. The apparatus according to claim 24, wherein the processor is further configured to
receive a further request for an authorization of connection parameters for service data flows of the communication connection flows that are to be controlled by the apparatus,
decide on the connection parameters to be authorized for a service data flow in question, and
generate and initiate sending of a further decision message to the third network element, wherein the further decision message comprises the authorization for the connection parameters of the service data flow in question.

26. The apparatus according to claim 25, wherein, when the processor receives a flow of the types of communication connections that are indicated to be controlled by the apparatus, the processor is configured to use at least one of an authorization token and a flow identification as binding information in the request from the apparatus.

27. The apparatus according to claim 24, wherein the first communication entity comprises user equipment connected with a mobile communication network.

28. The apparatus according to claim 24, wherein the third network element comprises a communication control or gateway network element of the communication network of a mobile communication network, wherein the communication control or gateway network element is configured to trigger a dynamic policy request.

29. The apparatus according to claim 24, wherein the processor is further configured to generate and initiate sending of the decision message based on at least one of a user subscription profile and application service information.

30. The apparatus according to claim 24, wherein the apparatus is a separate network element or included in the third network element.

31. The apparatus according to claim 24, wherein the connection parameters comprise a quality of service level provided for at least one of the communication connection and aggregate level parameters pertaining to the communication connection based on the initialized connection parameter request signaling.

32. The apparatus according to claim 24, wherein the service data flows are defined based on a service access point or on a service packet classifier.

33. The apparatus according to claim 24, wherein the decision message or messages comprise charging information for the communication connection using at least one service data flow.

34. The apparatus according to claim 24, wherein the service data flows include at least one of real-time service data flows and non real-time service data flows.

35. The apparatus according to claim 24, wherein, in a decision message, the processor is configured to receive aggregate connection parameters as a part of a set of parameters.

36. The apparatus according to claim 24, wherein the first communication entity is located in a different communication network or in a same communication network as a second communication entity with which the communication connection is established.

37. The apparatus according to claim 24, wherein the processor is further configured to set a default value for the connection parameters for other service data flows for which the apparatus is not to be consulted for a further authorization to admit the service data flow.

38. The apparatus according to claim 37, wherein a default value for connection parameters is set per service data flow.

39. The apparatus according to claim 24, wherein the decision message comprises an information portion from which it is derived that for other service data flows the apparatus is not to be consulted for a further authorization to admit the service flow.

40. An apparatus, comprising:
a processor configured to
receive, when a communication connection is initialized by a first communication entity, a connection parameter request signaling for at least one service data flow to be used in the communication connection, wherein at least one service data flow is used in the communication connection and the communication connection aggregates multiple service flows,
request, from a fourth network element, an authorization for the connection parameters, wherein the fourth network element is configured to decide on connection parameters to be authorized for the communication connection and on service data flows that can be provided for the communication connection,
receive from the fourth network element a decision message, wherein the decision message comprises an information portion for each service data flow, from which, for the each service data flow, it is derived that for at least one of service data flows the fourth network element is to be consulted for a further authorization to admit the at least one of service flows, and
process the decision message to enforce a decision of the fourth network element in the communication connection.

41. The apparatus according to claim 40, wherein the processor is further configured to
    determine, based on the information portion, service data flows of the communication connection flows that can be admitted by the apparatus without consulting the fourth network element, and further service data flows of the communication connection flows that are to be controlled by the fourth network element.

42. The apparatus according to claim 41, wherein the processor is configured to
    request, when the apparatus receives a flow of types of communication connections that are indicated to be controlled by the fourth network element, connection parameters for the further service data flows from the fourth network element, and
    receive from the fourth network element a further decision message generated based on a decision by the fourth network element on connection parameters to be authorized for the service data flow in question, based upon a request from the processor, wherein the further decision message comprises the authorization for the connection parameters of the service data flow in question.

43. The apparatus according to claim 41, wherein the processor is further configured to admit, when the apparatus receives a service data flow that is indicated to be controlled by the apparatus, the flow by using provisioned connection parameters for the service data flow.

44. The apparatus according to claim 40, wherein the processor is further configured to connect a mobile communication network with user equipment comprising the first communication entity.

45. The apparatus according to claim 40, wherein the apparatus comprises a communication control or gateway network element of the communication network, and wherein the communication control or gateway network element is configured to trigger a dynamic policy request.

46. The apparatus according to claim 40, wherein the fourth network element comprises a policy control network function to perform a decision based on at least one of a user subscription profile and application service information.

47. The apparatus according to claim 40, wherein the fourth network element is a separate network element or included in the communication control network element.

48. The apparatus according to claim 40, wherein the connection parameters comprise a quality of service level to be provided for at least one of the communication connection and aggregate level parameters pertaining to the communication connection based on the initialized connection parameter request signaling.

49. The apparatus according claim 40, wherein the service data flows are defined based on a service access point or on a service packet classifier.

50. The apparatus according to claim 40, wherein the decision message or messages comprise charging information for the communication connection using at least one service data flow.

51. The apparatus according to claim 40, wherein the service data flows include at least one of real-time service data flows and non real-time service data flows.

52. The apparatus according to claim 40, wherein, in a decision message, the processor is configured to initiate sending of aggregate connection parameters to the fourth network element from the apparatus as a part of a set of parameters.

53. The apparatus according to claim 40, wherein the processor, when session-based service data flows are authorized by the fourth network element, is configured to receive information about flows included in a session, as well as information pertaining to a commencement and termination of sessions.

54. The apparatus according to claim 40, wherein the first communication entity is located in a different communication network or in a same communication network as a second communication entity with which the communication connection is established.

55. A computer program embodied on a computer-readable storage medium, the program configured to control a processor to perform a process, the process comprising:
    receiving, by a fourth network element, a request by a third network element for an authorization for connection parameters, wherein at least one service type is used in a communication connection from a first communication entity to the third network element and the communication connection aggregates multiple service flows;
    deciding, in the fourth network element, on the connection parameters to be authorized for the communication connection and on service types that can be provided for the communication connection; and
    sending a decision message from the fourth network element to the third network element, wherein the decision message is processed to enforce a decision of the fourth network element in the communication connection, and wherein the decision message comprises an information portion for each service data flow, from which, for the each service flow, it is derived that for a first type of service flows the fourth network element is to be consulted for a further authorization to admit the first type of service flows.

56. A computer program embodied on a computer-readable storage medium, the program configured to control a processor to perform a process, the process comprising:
    receiving, by a third network element, when a communication connection is initialized by a first communication entity, a connection parameter request signaling for at least one service data flow to be used in the communication connection, wherein at least one service data flow is used in the communication connection and the communication connection aggregates multiple service flows;
    requesting, by the third network element from a fourth network element, an authorization for the connection parameters, wherein the fourth network element is configured to decide on connection parameters to be authorized for the communication connection and on service data flows that can be provided for the communication connection; and
    receiving, by the third network element, a decision message from the fourth network element, wherein the decision message is processed to enforce a decision of the fourth network element in the communication connection, and wherein the decision message comprises an information portion for each service data flow, from which, for the each service data flow, it is derived that for at least one of service data flows the fourth network element is to be consulted for a further authorization to admit the at least one of service flows.

57. A method, comprising:
    receiving, by a third network element, when a communication connection is initialized by a first communication entity, a connection parameter request signaling for at least one service data flow to be used in the communication connection, wherein at least one service data flow is used in the communication connection and the communication connection aggregates multiple service flows;

requesting, by the third network element from a fourth network element, an authorization for the connection parameters, wherein the fourth network element is configured to decide on connection parameters to be authorized for the communication connection and on service data flows that can be provided for the communication connection;

receiving, by the third network element, a decision message from the fourth network element, wherein the decision message comprises an information portion for each service data flow, from which, for the each service data flow, it is derived that for at least one of service data flows the fourth network element is to be consulted for a further authorization to admit the at least one of service flows; and processing the decision message to enforce a decision of the fourth network element in the communication connection.

58. The method according to claim 57, further comprising:
determining, based on the information portion, service data flows of the communication connection flows that can be admitted by the apparatus without consulting the fourth network element, and further service data flows of the communication connection flows that are to be controlled by the fourth network element.

59. The method according to claim 58, further comprising:
requesting, when a flow of types of communication connections is received that are indicated to be controlled by the fourth network element, connection parameters for the further service data flows from the fourth network element; and
receiving from the fourth network element a further decision message generated based on a decision by the fourth network element on connection parameters to be authorized for the service data flow in question, based upon the requesting, wherein the further decision message comprises the authorization for the connection parameters of the service data flow in question.

60. The method according to claim 58, further comprising:
admitting, when a service data flow that is indicated to be controlled by the third network element is received, the flow by using provisioned connection parameters for the service data flow.

61. The method according to claim 57, further comprising:
connecting a mobile communication network with user equipment comprising the first communication entity.

62. The method according to claim 57, further comprising:
providing a communication control or gateway network element of the communication network as the third network element, wherein the communication control or gateway network element is configured to trigger a dynamic policy request.

63. The method according to claim 57, wherein the fourth network element comprises a policy control network function to perform a decision based on at least one of a user subscription profile and application service information.

64. The method according to claim 57, wherein the fourth network element is a separate network element or included in the communication control network element.

65. The method according to claim 57, wherein the connection parameters comprise a quality of service level to be provided for at least one of the communication connection and aggregate level parameters pertaining to the communication connection based on the initialized connection parameter request signaling.

66. The method according claim 57, further comprising:
defining the service data flows based on a service access point or on a service packet classifier.

67. The method according to claim 57, wherein the decision message or messages comprise charging information for the communication connection using at least one service data flow.

68. The method according to claim 57, wherein the service data flows include at least one of real-time service data flows and non real-time service data flows.

69. The method according to claim 57, further comprising:
sending, in a decision message from the third network element, aggregate connection parameters to the fourth network element as a part of a set of parameters.

70. The method according to claim 57, further comprising:
receiving, when session-based service data flows are authorized by the fourth network element, information about flows included in a session, as well as information pertaining to a commencement and termination of sessions.

71. The method according to claim 57, wherein the first communication entity is located in a different communication network or in a same communication network as a second communication entity with which the communication connection is established.

72. An apparatus, comprising:
receiving means for receiving, by a fourth network element, a request by a third network element for an authorization for connection parameters, wherein at least one service data flow is used in a communication connection from a first communication entity to the third network element and the communication connection aggregates multiple service flows;

deciding means for deciding, in the fourth network element, on the connection parameters to be authorized for the communication connection and on service data flows that can be provided for the communication connection; and sending means for sending a decision message from the fourth network element to the third network element, wherein the decision message is processed to enforce a decision of the fourth network element in the communication connection, and wherein the decision message comprises an information portion for each service data flow, from which, for the each service data flow, it is derived that for at least one of service data flows the fourth network element is to be consulted for a further authorization to admit the at least one of service flows.

73. An apparatus, comprising:
receiving means for receiving, by a third network element, when a communication connection is initialized by a first communication entity, a connection parameter request signaling for at least one service data flow to be used in the communication connection, wherein at least one service data flow is used in the communication connection and the communication connection aggregates multiple service flows;

requesting means for requesting, by the third network element from a fourth network element, an authorization for the connection parameters, wherein the fourth network element is configured to decide on connection parameters to be authorized for the communication connection and on service data flows that can be provided for the communication connection; and receiving means for receiving, by the third network element, a decision message from the fourth network element, wherein the decision message is processed to enforce a decision of the fourth network element in the communication connection, and wherein the decision message comprises an information portion for each service data flow, from which, for the each service data flow, it is derived that for at least one of service data flows the fourth network element is to be consulted for a further authorization to admit the at least one of service flows.

74. A communication control network element usable in a system for controlling connection parameters for a communication connection, the communication control network element comprising:

means for receiving, when a communication connection is initialized by a first communication entity, a connection parameter request signaling for at least one service type to be used in the communication connection, means for requesting, from a fourth network element, an authorization for the connection parameters to be authorized for communication connection and on service type which can be provided for the communication connection, and means for receiving from the fourth network element a decision message, wherein the decision message is processed to enforce a decision of the fourth network element in the communication connection, and wherein the decision message comprises an information portion for each service, indicating for the each service, whether or not the fourth network element controls a further authorization regarding at least one of the service type in the communication connection.

* * * * *